(12) United States Patent
Takahashi

(10) Patent No.: US 11,293,615 B2
(45) Date of Patent: Apr. 5, 2022

(54) VEHICLE HEADLAMP

(71) Applicant: Ichikoh Industries, Ltd., Isehara (JP)

(72) Inventor: Noriyuki Takahashi, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 17/083,625

(22) Filed: Oct. 29, 2020

(65) Prior Publication Data

US 2021/0131636 A1 May 6, 2021

(30) Foreign Application Priority Data

Oct. 30, 2019 (JP) .............................. JP2019-197421

(51) Int. Cl.
*F21S 41/33* (2018.01)
*B60Q 1/04* (2006.01)
*F21V 7/09* (2006.01)

(52) U.S. Cl.
CPC .............. *F21S 41/334* (2018.01); *B60Q 1/04* (2013.01); *F21S 41/33* (2018.01); *F21S 41/336* (2018.01); *F21V 7/09* (2013.01)

(58) Field of Classification Search
CPC ........ F21S 41/334; F21S 41/336; F21S 41/31; B60Q 1/04; F21V 7/09

USPC .......................................... 362/516, 518, 507
See application file for complete search history.

(56) References Cited

U.S. PATENT DOCUMENTS

| | | | |
|---|---|---|---|
| 10,302,257 B2 * | 5/2019 | Ahn | ........................ F21S 41/16 |
| 10,557,610 B1 * | 2/2020 | Lim | ........................ F21S 41/336 |
| 2009/0268480 A1 * | 10/2009 | Nishihata | .............. F21S 41/155 |
| | | | 362/516 |
| 2018/0142859 A1 * | 5/2018 | Watanabe | ................ F21S 41/36 |

FOREIGN PATENT DOCUMENTS

| | | | | |
|---|---|---|---|---|
| DE | 3836382 A1 * | 5/1990 | ............ | F21S 41/338 |
| JP | 2009-104815 A | 5/2009 | | |

* cited by examiner

*Primary Examiner* — Laura K Tso
(74) *Attorney, Agent, or Firm* — Oblon, McClelland, Maier & Neustadt, L.L.P.

(57) ABSTRACT

A vehicle headlamp includes a light source, a holding portion that holds the light source, and a reflector on which the holding portion is mounted and having a reflective surface for reflecting light from the light source. The reflector has a concave portion in a portion associated with the holding portion. The concave portion has a wall surface that reflects light from the light source on an end portion thereof on a vehicle inner side. The wall surface has a detour bending portion extending in an up-down direction and having a shape that winds back and forth on a front end periphery in a vehicle-mounted state.

6 Claims, 7 Drawing Sheets

VEHICLE HEADLAMP

CROSS REFERENCE TO RELATED APPLICATIONS

This application claims priority of Japanese Patent Application No. 2019-197421 filed on Oct. 30, 2019. The contents of the application are incorporated herein by reference in their entirety.

BACKGROUND OF THE INVENTION

Field of the Invention

The present invention relates to a vehicle headlamp.

Description of the Related Art

There is known a vehicle headlamp including a light source, a holding portion that holds the light source, and a reflector on which the holding portion is mounted and having a reflective surface for reflecting light from the light source toward the vehicle front side (see, for example, Japanese Unexamined Patent Application Publication No. 2009-104815 and the like).

SUMMARY OF THE INVENTION

In such a vehicle headlamp, it is required to prevent glare light from being generated when light is reflected toward the vehicle front side by a reflector.

The present invention has been made in view of the above, and an object of the present invention is to provide a vehicle headlamp capable of suppressing generation of glare light.

A vehicle headlamp according to the present invention includes a light source, a holding portion that holds the light source, and a reflector on which the holding portion is mounted and having a reflective surface for reflecting light from the light source. The reflector has a concave portion in a portion associated with the holding portion. The concave portion has a wall surface that reflects light from the light source on at least one end thereof in a left-right direction in a vehicle-mounted state. The wall surface has a detour bending portion extending in a vertical direction and having a shape that winds back and forth on a front end periphery thereof in the vehicle-mounted state.

In the above-described vehicle headlamp, the wall surface may be arranged on an end portion on one side in the left-right direction, and the reflective surface may include a reflecting area arranged on the other side in the left-right direction with respect to the concave portion.

In the above-described vehicle headlamp, the one side may be a vehicle inner side in the left-right direction, and the other side may be a vehicle outer side in the left-right direction.

In the above-described vehicle headlamp, a portion including a front end periphery of the wall surface may be tilted toward the vehicle outer side.

In the above-described vehicle headlamp, the wall surface may include a plurality of knurled portions in the vertical direction, each of which protrudes in a curved state toward the vehicle outer side and extends in the front-rear direction in the vehicle-mounted state, and the knurled portion may be arranged at a position rearward away from the front end periphery of the wall surface.

In the above-described vehicle headlamp, the detour bending portion may be arranged on an upper portion of the end periphery in the vehicle-mounted state.

The present invention is able to suppress generation of glare light.

DESCRIPTION OF THE PREFERRED EMBODIMENTS

In the following, an embodiment of a vehicle headlamp according to the present invention is described with reference to the drawings. The present invention is not limited to this embodiment. In addition, components in the following embodiment include those that can be replaced and easily replaced by a person skilled in the art, or those that are substantially the same. In the following description, each of front and rear directions (forward, rearward), up and down directions (upward, downward), and left and right directions (leftward, rightward) indicates a direction in a state that the vehicle headlamp is mounted on a vehicle, and indicates a direction when the front side of the vehicle is viewed in a state that a driver is seated in a driver's seat. In the present embodiment, it is assumed that an up-down direction is in parallel to a vertical direction, and a left-right direction is a horizontal direction.

Figure 1:
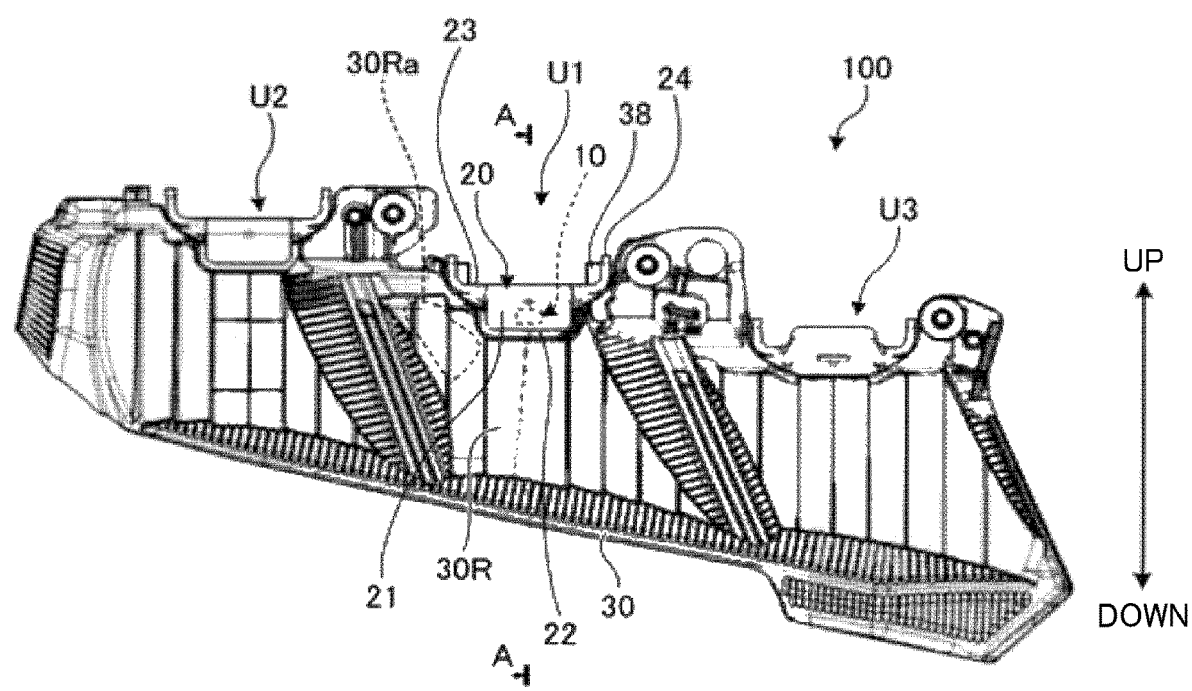
FIG. 1 is a plan view showing one example of a vehicle headlamp according to the present embodiment.
Figure 1:

FIG. 1 is a plan view showing one example of a vehicle headlamp 100 according to the present embodiment. The vehicle headlamp 100 shown in FIG. 1 is a so-called reflector type lighting tool used as a headlamp of a vehicle. The vehicle headlamp 100 is mounted on, for example, left and right front portions of the vehicle. In the following, the vehicle headlamp 100 to be mounted on the front right side of the vehicle is described as an example. Therefore, in the vehicle headlamp 100, the right side in the left-right direction is a vehicle outer side, and the left side in the left-right direction is a vehicle inner side. It is possible to configure a vehicle headlamp to be mounted on the front left side of the vehicle to be symmetrical in the left-right direction with respect to the vehicle headlamp 100.

As shown in FIG. 1, the vehicle headlamp 100 has a plurality of light source units U1 to U3. The light source unit U1 is arranged in the middle in the left-right direction, and forms a part of a low beam pattern in front of the vehicle, for example. The light source unit U2 is arranged on the outermost side of the vehicle in the left-right direction, and forms a part of a low beam pattern in front of the vehicle. The light source unit U1 forms a flat pattern such as a diffusion pattern among the low beam pattern. Further, the light source unit U2 forms a pattern having a cut-off line among the low beam pattern. The light source unit U3 is arranged on the innermost side of the vehicle in the left-right direction, and forms another pattern such as a high beam pattern in front of the vehicle, for example. In the present embodiment, a configuration having at least the light source unit U1 is described as the vehicle headlamp 100.

Figure 2:
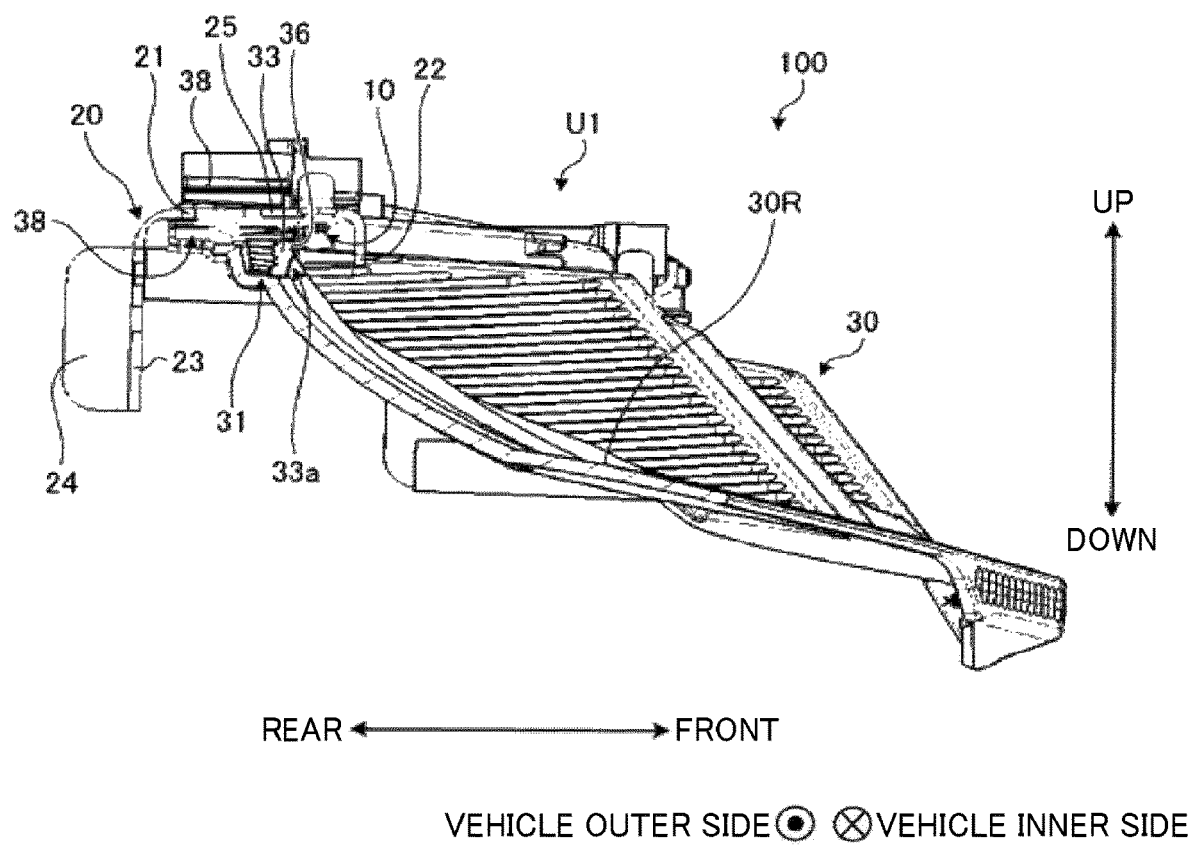
FIG. 2 is a cross-sectional view taken along the cross section A-A in FIG. 1.
Figure 3:
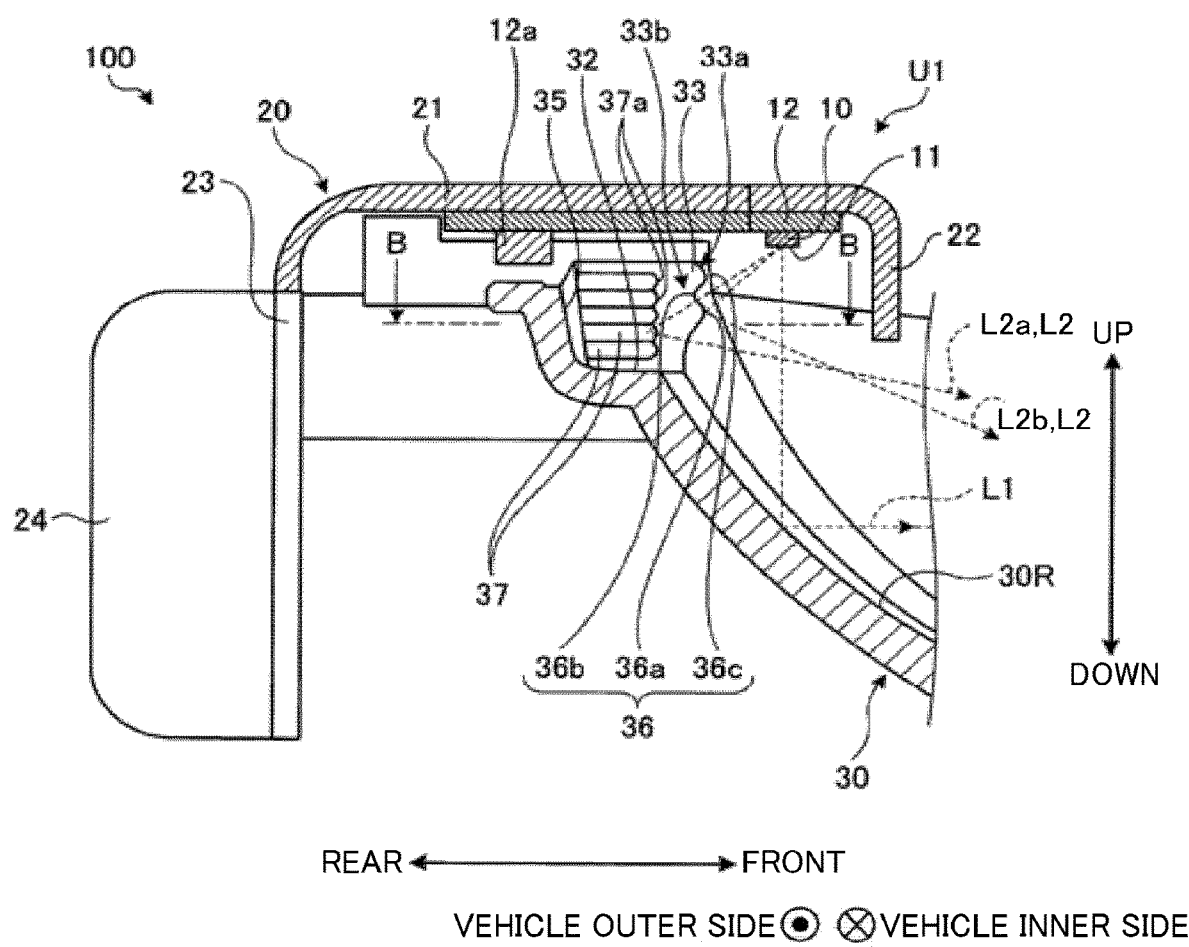
FIG. 3 is a diagram enlargedly showing a part of FIG. 2.

FIG. 2 is a cross-sectional view taken along the cross section A-A in FIG. 1. FIG. 3 is a diagram enlargedly showing a part of FIG. 2. As shown in FIGS. 1 to 3, the vehicle headlamp 100 includes a light source 10, a holding portion 20, and a reflector 30.

[Light Source]

In the present embodiment, the light source 10 is a semiconductor type light source such as an LED or an OLED (organic EL), for example. The light source 10 has a light emitting surface 11 that emits light in such a way as to form a Lambertian distribution. When the vehicle headlamp 100 is mounted on a vehicle, the light emitting surface faces downward, for example, and is arranged in parallel to a horizontal plane. The light source 10 is mounted on a base plate 12. The base plate 12 is held on the holding portion 20. The base plate 12 is provided with a connector 12a that connects wiring for supplying electric power, an electric signal, and the like to the light source 10.

[Holding Portion]

Figure 4:
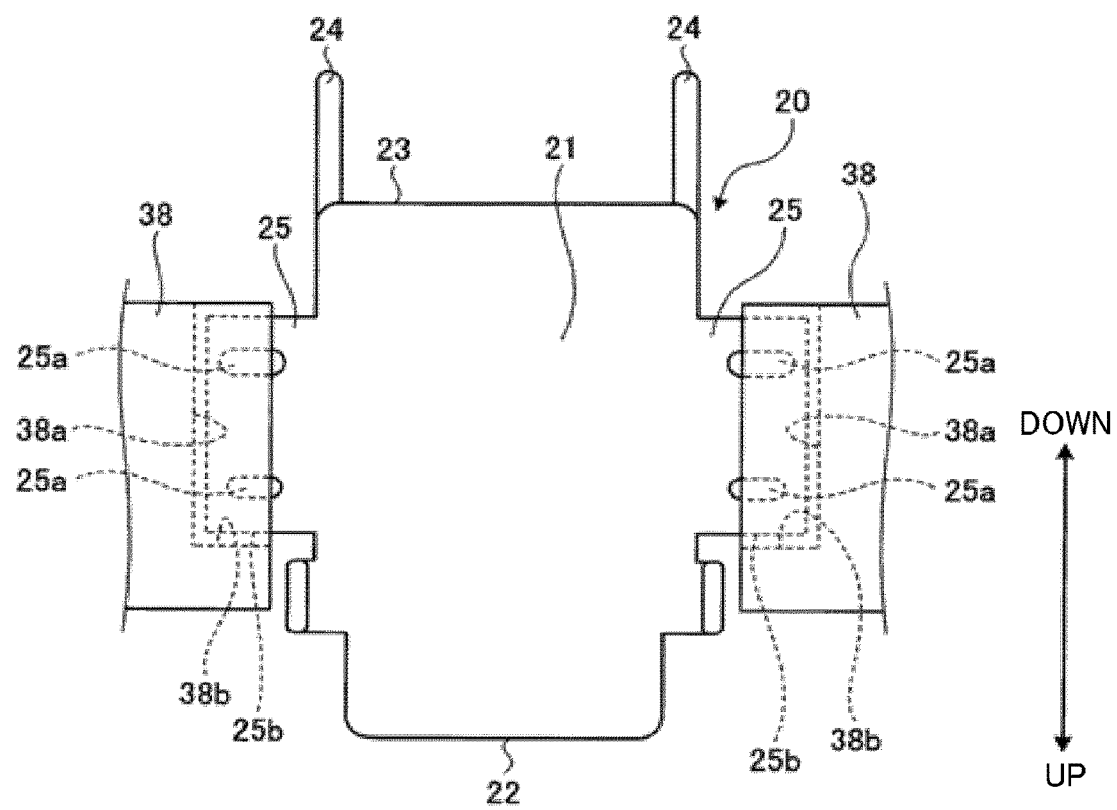
FIG. 4 is a diagram showing one example of a configuration in which a holding portion is viewed from above.

The holding portion 20 holds the light source 10. The holding portion 20 has a base portion 21, a front side piece 22, a rear side piece 23, a rib 24, and a sliding portion 25 (see FIG. 4 and the like). The base portion 21, the front side piece 22, the rear side piece 23, and the rib 24 each have a plate shape. The base portion 21 has a holding surface for holding the base plate 12 of the light source 10. The holding surface is, for example, in parallel to a horizontal plane. The front side piece 22 has a configuration in which a front end portion of the base portion 21 in the front-rear direction is bent downward. The rear side piece 23 has a configuration in which a rear end portion of the base portion 21 in the front-rear direction is bent downward. The rib 24 is formed at both ends of the rear side piece 23 in the left-right direction. FIG. 4 is a diagram showing one example of the configuration in which the holding portion 20 is viewed from above. As shown in FIG. 4, the sliding portion 25 is formed to protrude toward the vehicle outer side and the vehicle inner side from the base portion 21. The sliding portion 25 is inserted into a guide groove 38a of a mounting portion 38 to be described later.

[Reflector]

The reflector 30 reflects light from the light source 10 toward the vehicle front side. The reflector 30 is arranged below the light source 10. A reflective surface 30R is formed on an inner surface of the reflector 30. The reflective surface 30R is, for example, divided into a plurality of segments. Light to be reflected toward the vehicle front side by the reflective surface 30R forms a low beam pattern P (see FIG. 7) in front of the vehicle. The reflector 30 is constituted of one member for each of the light source units U1 to U3, for example. However, the present embodiment is not limited to this, and a reflector may be provided separately for at least one of the light source units U1 to U3.

As shown in FIG. 4, the reflector 30 has the mounting portion 38 for mounting the holding portion 20. The mounting portion 38 has the guide groove 38a for guiding the sliding portion 25. The guide groove 38a is formed in parallel to the front-rear direction. The guide groove 38a has an end surface 38b on a front end thereof. The end surface 38b of the guide groove 38a is set in advance in such a way that the light source 10 is arranged at a predetermined position with respect to the reflective surface 30R.

When the holding portion 20 is mounted on the mounting portion 38, first, the front side piece 22 and the light source 10 are placed in front of the mounting portion 38 from above the mounting portion 38, and the sliding portion 25 is inserted into the guide groove 38a of the mounting portion 38. By sliding the holding portion 20 forward in this state, the sliding portion 25 is guided to the guide groove 38a. The holding portion 20 is mounted by moving the sliding portion 25 to a position where a front end surface 25b of the sliding portion 25 comes into contact with the end surface 38b of the guide groove 38a. A convex portion 25a is formed on an upper surface of the sliding portion 25. When the sliding portion 25 is inserted into the guide groove 38a, by causing the convex portion 25a to come into contact with an upper portion of the guide groove 38a, a position of the sliding portion 25 in the vertical direction is defined. Thus, a position of the holding portion 20 in the vertical direction is defined. After the holding portion 20 is mounted, the holding portion 20 can be fixed by using a fixing member such as a screw.

The reflector 30 has a concave portion 31 in a portion associated with the holding portion 20. The concave portion 31 is formed in such a way that the front side piece 22 of the holding portion 20 and the reflector 30 do not interfere with each other, when the holding portion 20 is mounted on the reflector 30. The concave portion 31 has a bottom surface 32, wall surfaces 33, 34, and a back surface 35. The bottom surface 32, the wall surfaces 33, 34, and the back surface 35 are each formed to be able to reflect light from the light source 10.

The bottom surface 32 is formed along a horizontal plane. The wall surfaces 33, 34 are arranged perpendicular or generally perpendicular to the bottom surface 32. The wall surface 33 is arranged on an end portion of the bottom surface 32 on the vehicle inner side in the left-right direction. The wall surface 33 has an end periphery 33a on a front end portion thereof. The wall surface 34 is arranged on an end portion of the bottom surface 32 on the vehicle outer side in the left-right direction.

The wall surface 33 has the end periphery 33a on the front end portion thereof. A detour bending portion 36 is formed on the end periphery 33a. The detour bending portion 36 extends in the vertical direction along the end periphery 33a. The detour bending portion 36 has a shape that winds back and forth, in other words, a shape that is curved alternately forward and rearward in the vertical direction. The detour bending portion 36 can be arranged on an upper portion of the end periphery 33a. Specifically, the detour bending portion 36 can be arranged in an upper half area in the vertical direction.

The detour bending portion 36 has a first curved portion 36a, a second curved portion 36b, and a third curved portion 36c. The first curved portion 36a is arranged at the lowest position among the three curved portions, and is curved to protrude forward. The second curved portion 36b is arranged above the first curved portion 36a, is smoothly continued to the first curved portion 36a, and is curved to protrude rearward. The third curved portion 36c is located at the highest position among the three curved portions, is arranged above the second curved portion 36b, is smoothly continued to the second curved portion 36b, and is curved to protrude forward. In this way, the detour bending portion 36 has a shape that winds back and forth. In the present embodiment, the first curved portion 36a and the third curved portion 36c that are arranged on both ends in the vertical direction are curved to protrude forward, and the second curved portion 36b that can be arranged therebetween has a shape that is curved to protrude rearward. However, the present embodiment is not limited to this. For example, the first curved portion 36a and the third curved portion 36c may have a shape that is curved rearward, and the second curved portion 36b may have a shape that is curved forward. Further, in the present embodiment, a configuration in which the detour bending portion 36 has three curved portions, namely, the first curved portion 36a to the third curved portion 36c is described as an example. However, the present embodiment is not limited to this. For example, the detour bending portion 36 may have two or four or more curved portions that are curved forward and rearward.

The wall surface 33 has a plurality of knurled portions 37. The plurality of knurled portions 37 are arranged side by side in the vertical direction. Each of the knurled portions 37 extends in the front-rear direction. The knurled portion 37 has a shape that protrudes to curve from the wall surface 33 toward the vehicle outer side. The knurled portion 37 diffusely reflects light from the light source 10.

The knurled portion 37 is arranged at a position where a front end portion 37a is spaced from the front end periphery 33a of the wall surface 33. In other words, a flat portion 33b is formed between the front end portion 37a of the knurled portion 37, and the front end periphery 33a of the wall surface 33.

The reflective surface 30R is also arranged in an area (reflecting area) 30Ra on the vehicle outer side with respect to the above-described concave portion 31. By forming the area 30Ra, it becomes possible to use light to be irradiated from the light source 10 without waste.

Figure 5:
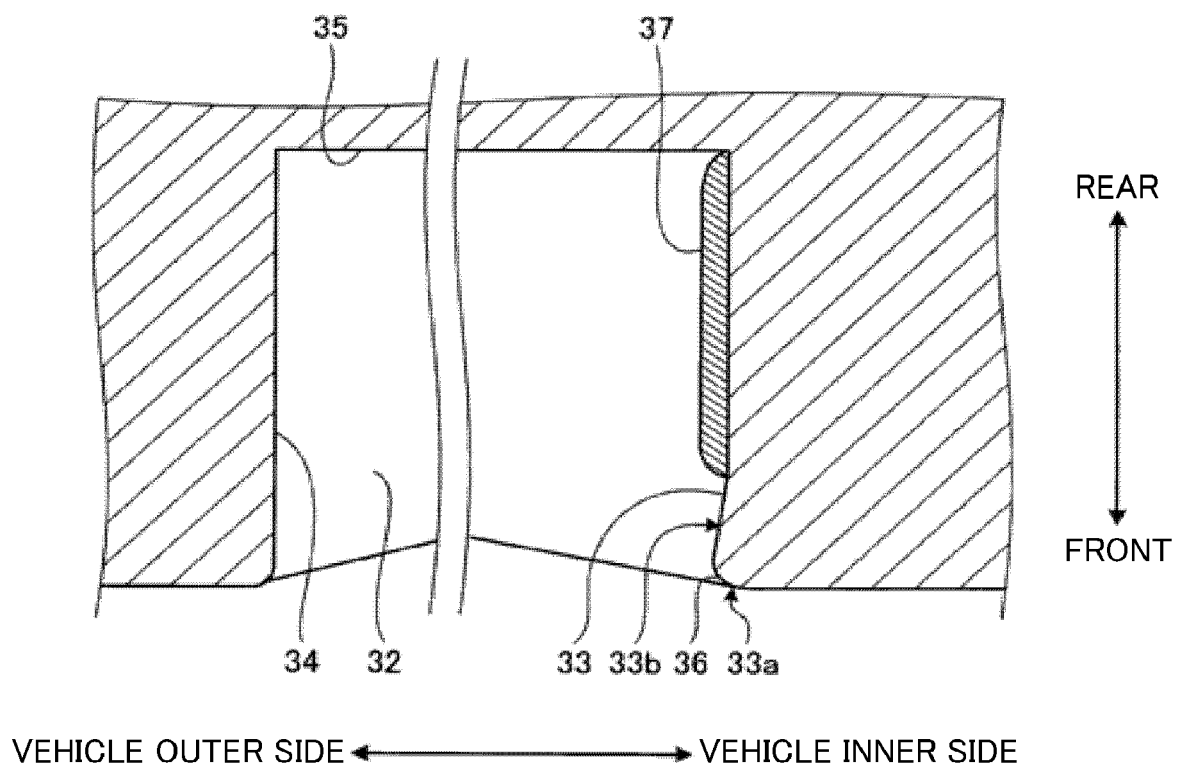
FIG. 5 is a diagram showing a configuration along the cross section B-B in FIG. 3.
Figure 6:
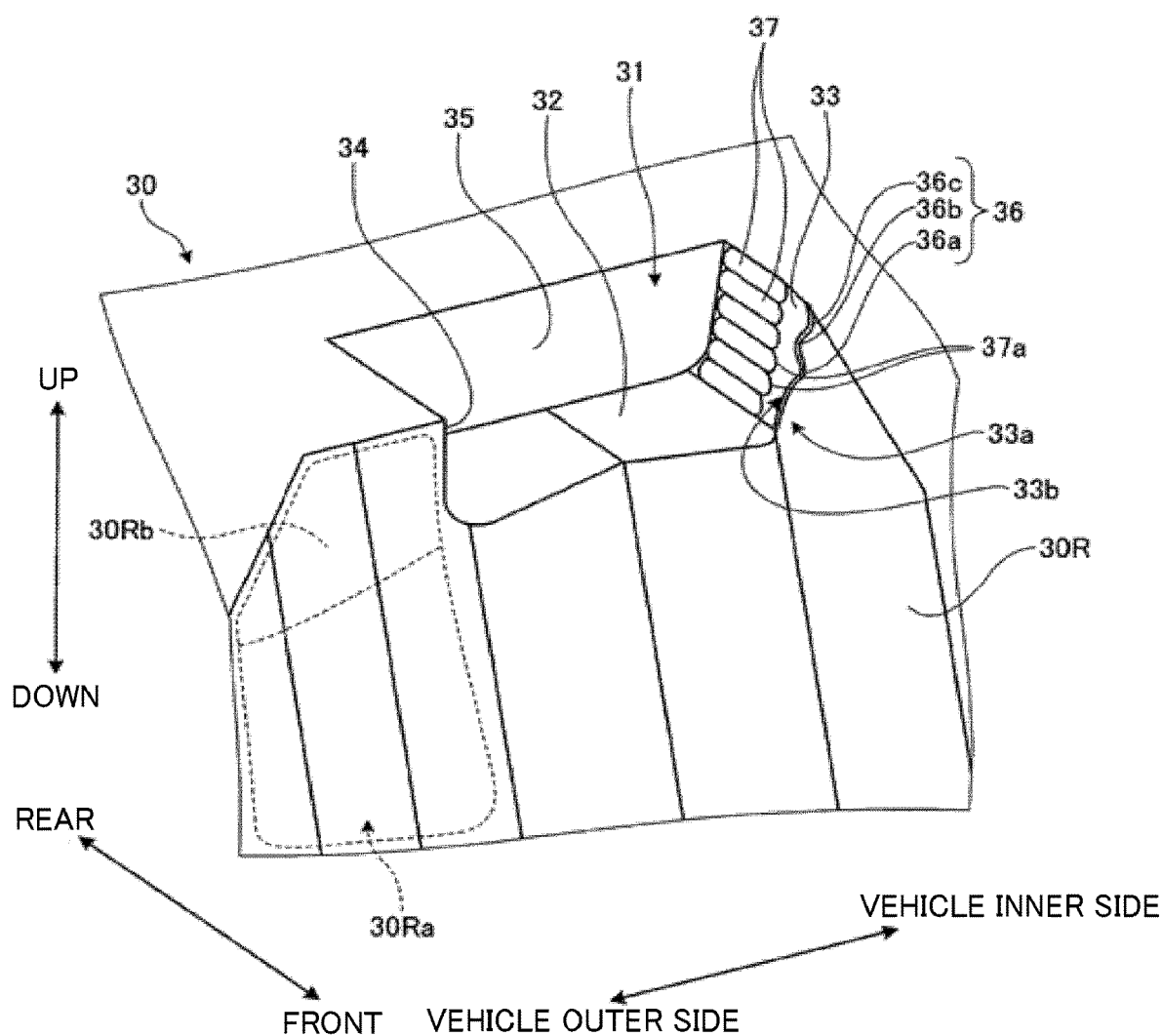
FIG. 6 is a perspective view showing one example of a concave portion.

FIG. 5 is a diagram showing a configuration along the cross section B-B in FIG. 3. FIG. 6 is a perspective view showing one example of the concave portion 31. As shown in FIGS. 5 and 6, a portion of the wall surface 33 including the front end periphery 33a is tilted toward the vehicle outer side. In the example shown in FIGS. 5 and 6, a configuration is shown in which an area where the knurled portion 37 is formed is formed in parallel to the front-rear direction, and the flat portion 33b is tilted toward the vehicle outer side with respect to the front-rear direction. However, the present embodiment is not limited to this. For example, the entirety of the wall surface 33 may be tilted toward the vehicle outer side with respect to the front-rear direction. Also, as shown in FIGS. 5 and 6, the wall surface 33 may have a rounded shape on the end periphery 33a, for example. In this case, the detour bending portion 36 to be formed on the end periphery 33a may also have a rounded shape. The reflector 30 may be formed, for example, by molding using a die. In this case, in order to consider a draft angle in the drawing direction of the die, the entirety of the wall surface 33 and the wall surface 34 of the concave portion 31 may have a shape that spreads from the rear side to the front side.

[Operation]

Next, an operation of the vehicle headlamp 100 configured as described above is described. Light is emitted from the light emitting surface 11 by turning on the light source 10 of the vehicle headlamp 100. As shown in FIG. 3, light L1 that is directly incident on the reflective surface 30R of the reflector 30, among the light to be emitted from the light emitting surface 11, is reflected toward the vehicle front side by the reflective surface 30R including the area 30Ra. Light reflected toward the vehicle front side forms a low beam pattern P (see FIG. 7), for example, in front of the vehicle.

Further, among the light emitted from the light emitting surface 11, for example, light L2 that is incident on the concave portion 31 is reflected on the bottom surface 32, the wall surfaces 33, 34, and the back surface 35 of the concave portion 31. A part of light L2a among the light L2 is diffused, for example, by the knurled portion 37 of the wall surface 33, and the like.

In addition, a part of light L2b among the light L2 reaches, for example, the front end periphery 33a of the wall surface 33, and is diffused by the detour bending portion 36 formed on the end periphery 33a.

Figure 7:
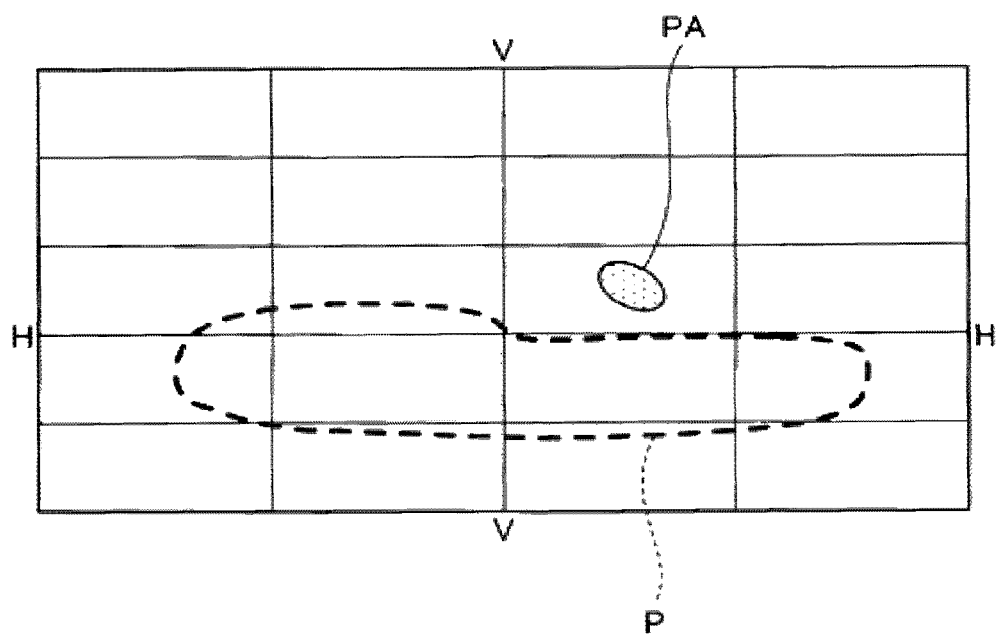
FIG. 7 is a diagram showing one example of a low beam pattern to be irradiated on a virtual screen in front of a vehicle.

FIG. 7 is a diagram showing one example of a low beam pattern (a pattern having a cut-off line), which is irradiated on a virtual screen in front of the vehicle. In FIG. 7, the line V-V indicates a vertical line of the screen, and the line H-H indicates a horizontal line of the screen. Herein, it is assumed that an intersection of the vertical line and the horizontal line is a reference position in the horizontal direction.

Herein, in a configuration in which the detour bending portion 36 is not formed on the end periphery 33a, light that reaches the end periphery 33a may reach the area 30Ra of the reflective surface 30R (more specifically, an upper area 30Rb of the area 30Ra (see FIG. 6)) without being diffused. This light is irradiated above the low beam pattern P in front of the vehicle, and a light pool is formed. This light pool becomes glare light.

Contrary to this, in the light source unit U1 in which the detour bending portion 36 is formed on the end periphery 33a, as shown in FIG. 7, the light L2b that is irradiated on the end periphery 33a is reflected in a state that the light L2b is diffused on the detour bending portion 36. In addition, a part of the light L2b passes through the second curved portion 36b of the detour bending portion 36 and escapes to the outside of the concave portion 31. Therefore, compared with a case where the detour bending portion 36 is not formed, the light amount of the light L2b that reaches the area 30Ra of the reflective surface 30R is reduced. Thus, formation of a light pool as described above is suppressed, and light is irradiated toward the vehicle front side in a state that light is diffused compared with the light pool, and in a state that the amount of light per unit area is reduced (irradiation area PA in FIG. 7).

Further, in the vehicle headlamp 100 according to the present embodiment, a portion of the wall surface 33 including the end periphery 33a is tilted toward the vehicle outer side with respect to the front-rear direction. Therefore, a part of the light L2b that reaches the end periphery 33a from the light source 10 is reflected toward the outside of the area 30Ra of the reflective surface 30R. Thus, formation of a light pool is suppressed, and generation of glare light is suppressed, because the light amount of the light L2b that reaches the area 30Ra is reduced.

As described above, the vehicle headlamp 100 according to the present embodiment includes the light source 10, the holding portion 20 that holds the light source 10, and the reflector 30 on which the holding portion 20 is mounted and having the reflective surface 30R for reflecting light from the light source 10. The reflector 30 has the concave portion 31 in a portion associated with the holding portion 20. The concave portion 31 has the wall surface 33 that reflects light from the light source 10 on an end thereof on the vehicle inner side. The wall surface 33 has the detour bending portion 36 extending in the vertical direction and having a shape that winds back and forth on the front end periphery 33a in a vehicle-mounted state.

According to this configuration, since the detour bending portion 36 is formed on the front end periphery 33a of the wall surface 33 in the vehicle-mounted state, the light L2b that is irradiated from the light source 10 and reaches the detour bending portion 36 is diffused by the detour bending portion 36. Therefore, as compared with a configuration in which the detour bending portion 36 is not formed, it is possible to reduce the light amount of the light L2b that is reflected on the detour bending portion 36 and reaches the reflective surface 30R. Thus, it is possible to suppress the light amount when the light L2b is irradiated toward the vehicle front side, and it is possible to suppress generation of glare light.

In the vehicle headlamp 100 according to the present embodiment, the wall surface 33 is arranged on an end portion on one side in the left-right direction, and the reflective surface 30R has the area 30Ra arranged on the other side in the left-right direction with respect to the concave portion 31. Thus, it is possible to reduce the light amount of the light L2b that is reflected on the detour bending portion 36 and reaches the area 30Ra on the opposite side in the left-right direction with respect to the concave portion 31. In the vehicle headlamp 100 according to the present embodiment, the one side may be the vehicle inner side in the left-right direction, and the other side may be the vehicle outer side in the left-right direction.

In the vehicle headlamp 100 according to the present embodiment, the wall surface 33 is tilted toward the vehicle outer side, namely, toward the front end periphery 33a side of the wall surface 33. In this configuration, it is possible to reflect a part of the light L2b toward the outside of the area 30Ra of the reflective surface 30R. Therefore, it is possible to suppress generation of glare light, because it is possible to reduce the light amount of the light L2b that is reflected on the area 30Ra.

In the vehicle headlamp 100 according to the present embodiment, the wall surface 33 has the plurality of knurled portions 37 in the vertical direction, each of which protrudes in a curved state toward the vehicle outer side, and extends in the front-rear direction. The knurled portion 37 is arranged at a position rearward away from the front end periphery 33a of the wall surface 33. This makes it possible to suppress generation of glare light due to light reflected on the knurled portion 37.

In the vehicle headlamp 100 according to the present embodiment, the detour bending portion 36 is arranged on an upper portion of the end periphery 33a in the vehicle-mounted state. This makes it possible to diffuse the light L2b on the upper portion of the end periphery 33a, which is near the light source 10.

The technical scope of the present invention is not limited to the above-described embodiment, and it is possible to add modifications as necessary without departing from the spirit of the present invention. For example, in the above-described embodiment, a configuration in which the detour bending portion 36 is formed on the wall surface 33 of the concave portion 31 on the vehicle inner side in the left-right direction is described as an example. However, the present embodiment is not limited to this. A configuration similar to the configuration of the detour bending portion 36 may be formed on at least one of the wall surface 33 and the wall surface 34 in the concave portion 31. In other words, a configuration similar to the configuration of the detour bending portion 36 may be formed on the wall surface 34 on the vehicle outer side.

Further, for example, in the above-described embodiment, a configuration in which the wall surface 33 including the detour bending portion 36 is arranged on the vehicle inner side, and the area 30Ra of the reflective surface 30R is arranged on the vehicle outer side with respect to the concave portion 31 is described as an example. However, the present embodiment is not limited to this. For example, the wall surface 33 having the detour bending portion 36 may be arranged on the vehicle outer side, and the area 30Ra of the reflective surface 30R may be arranged on the vehicle inner side with respect to the concave portion 31.

Further, in the above-described embodiment, a configuration in which the flat portion 33b of the wall surface 33 is tilted toward the vehicle outer side with respect to the front-rear direction is described as an example. However, the present embodiment is not limited to this. For example, the entirety of the wall surface 33 may be formed along the front-rear direction.

Further, in the above-described embodiment, a configuration in which the plurality of knurled portions 37 are formed on the wall surface 33 is described as an example. However, the present embodiment is not limited to this. The knurled portion 37 may not be formed.

Further, in the above-described embodiment, a configuration of the light source unit U1 is described as an example. However, the present embodiment is not limited to this. For example, a configuration similar to the above may be applied to the light source units U2 and U3.

What is claimed is:

1. A vehicle headlamp comprising:
   a light source;
   a holding portion that holds the light source; and
   a reflector, on which the holding portion is mounted, including a reflective surface for reflecting light from the light source, wherein
   the reflector has a concave portion, an opening of the concave portion faces in a direction of the holding portion,
   the concave portion has a wall surface that reflects light from the light source on at least one end thereof in a left-right direction in a vehicle-mounted state, and
   the wall surface has a detour bending portion extending in a vertical direction and having a shape that winds back and forth on a front end periphery thereof in the vehicle-mounted state.

2. The vehicle headlamp according to claim 1, wherein
   the wall surface is arranged on an end portion on one side in the left-right direction, and
   the reflective surface includes a reflecting area arranged on the other side in the left-right direction with respect to the concave portion.

3. The vehicle headlamp according to claim 2, wherein
   the one side is a vehicle inner side in the left-right direction, and
   the other side is a vehicle outer side in the left-right direction.

4. The vehicle headlamp according to claim 3, wherein
   a portion including a front end periphery of the wall surface is tilted toward the vehicle outer side.

5. The vehicle headlamp according to claim 3, wherein
   the wall surface includes a plurality of knurled portions in the vertical direction, each of which protrudes in a curved state toward the vehicle outer side and extends in the front-rear direction in the vehicle-mounted state, and
   the knurled portion is arranged at a position rearward away from the front end periphery of the wall surface.

6. The vehicle headlamp according to claim 1, wherein
   the detour bending portion is arranged on an upper portion of the end periphery in the vehicle-mounted state.

* * * * *